Patented July 10, 1923.

1,461,386

UNITED STATES PATENT OFFICE.

WILLIAM B. FALOR, OF AKRON, OHIO.

BRAKE-LINING DRESSING.

No Drawing. Application filed October 10, 1921. Serial No. 506,929.

*To all whom it may concern:*

Be it known that I, WILLIAM B. FALOR, a citizen of the United States, residing at Akron, in the county of Summit and State of Ohio, have invented new and useful Improvements in Brake-Lining Dressings, of which the following is a specification.

This invention has relation to a new and useful composition which is particularly adapted to be used as a dressing for brake linings, but may be used to advantage on clutch facings, drive belts, shock absorbers, snubbers and the like.

The main object of the invention is to provide a simple, durable, inexpensive dressing which when used on brake lining, or other fabric or flexible parts adapted to function by frictional engagement with other members or things, will cause the same to act smoothly without vibration or noise.

A further object is to provide a dressing of the type above indicated which will protect and preserve brake lining or other fabric and will fill in interstices and depressions therein and protect the same from the absorption of moisture.

A still further object is to provide a dressing which when applied to brake lining or similar parts will increase the frictional properties thereof and will render the same more efficient and durable.

The above and additional objects are accomplished and additional ends are attained by the new and novel composition of matter herein described, it being understood that my invention is capable of various adaptations and that changes and modifications may be made or substitutions resorted to which come within the scope of the claims hereunto appended.

In carrying out my invention I take an oleaginous substance and thoroughly mix therewith, a resinous substance and fuller's earth, varying the proportions of each in accordance with the result desired.

The oleaginous substance used is preferably a thick petroleum oil, to which is added a resinous substance, preferably in a finely powdered form, and fuller's earth. I have obtained highly satisfactory results by combining the ingredients in the following proportions:

Two (2) gallons 600W petroleum oil.
One (1) pound finely powdered rosin.
Three-fourths (¾) pound fuller's earth.

These ingredients are thoroughly mixed and form a semi-liquid composition. The relative quantities of the above ingredients may be varied in accordance with the result desired and in accordance with the properties of the material to which it is to be applied.

If desired, an emulsified agent may be added to the above ingredients to improve the appearance of the product or substances may be placed therein to lend a pleasant odor thereto, but such substances do not contribute to the efficiency of the product.

My improved dressing may be applied to the brake lining or similar part or substance with a brush or other device or it may be applied to the brake drum or other part adapted to be engaged by said lining. In applying the same to the brakes of an automobile, I find that it can be placed on the brake drum and will be carried by the rotation of the drum and distributed evenly over the surface of the lining.

Having thus described my composition, what I claim and desire to secure by Letters-Patent is:—

1. A composition for the purposes set forth consisting of an oleaginous substance, a resinous substance and fuller's earth, in approximately the proportions named.

2. A dressing for brake lining and the like consisting of petroleum oil, resin and fuller's earth, substantially as described.

3. A composition for the purposes described consisting of heavy petroleum oil, powdered rosin and fuller's earth, substantially as described.

4. A composition consisting of the following ingredients in approximately the proportions named; two gallons 600W petroleum oil, one pound finely powdered rosin and three-fourths pound fuller's earth.

In testimony whereof I have hereunto set my hand.

WILLIAM B. FALOR.